No. 861,704. PATENTED JULY 30, 1907.
W. BREW.
BEARING.
APPLICATION FILED MAY 28, 1906.

2 SHEETS—SHEET 1.

Witnesses:
C. Heymann.
L. Lang.

Inventor
William Brew
by B. Singer atty

No. 861,704. PATENTED JULY 30, 1907.
W. BREW.
BEARING.
APPLICATION FILED MAY 28, 1906.

2 SHEETS—SHEET 2.

Witnesses:
C. Heymann.
L. Lang.

Inventor:
William Brew
by B. Singer
atty

UNITED STATES PATENT OFFICE.

WILLIAM BREW, OF CHRISTCHURCH, NEW ZEALAND.

BEARING.

No. 861,704.　　　　　Specification of Letters Patent.　　　　Patented July 30, 1907.

Application filed May 28, 1906. Serial No. 319,175.

*To all whom it may concern:*

Be it known that I, WILLIAM BREW, engineer, a subject of the King of Great Britain and Ireland, residing at Christchurch, in the Colony of New Zealand, have invented a new and useful Bearing; and I do hereby declare the following to be a full, clear, and exact description of the same.

This invention relates to bearings for use with plows and other agricultural machinery and it has been designed principally in order to provide for the better lubrication thereof than is possible with the ordinary form of bearing.

In describing my invention I will describe it in relation to the bearings for plow wheels, skeiths and disk harrows, but it must be understood that it may be employed in other analogous circumstances in which a wheel is to rotate about a fixed axle or an axle is to rotate within a fixed bearing.

The invention consists in providing a central hollow pear-shaped casting which is made in one with or fixed to an axle so as to constitute a bearing around which the boss of a wheel may fit and revolve, or which may revolve itself within a bearing shaped to envelop it. This hollow is adapted to contain a lubricating oil and provision is made whereby it may be filled when required. The wall of this central casting is formed with a number of apertures therein through which the oil may pass so as to work between the faces of the fixed and moving parts.
Suitable washers for preventing any escape of the oil are provided.

Figure 1:
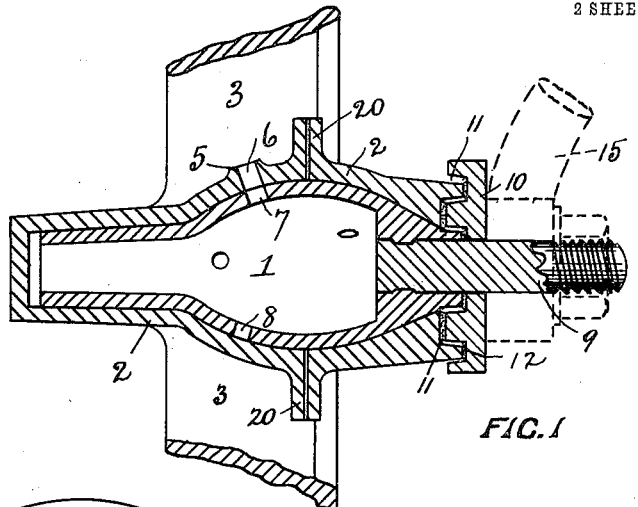
Figure 2:
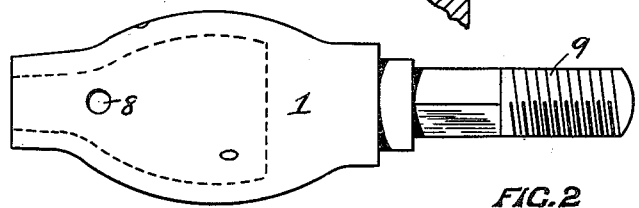
Figures 3, 4:
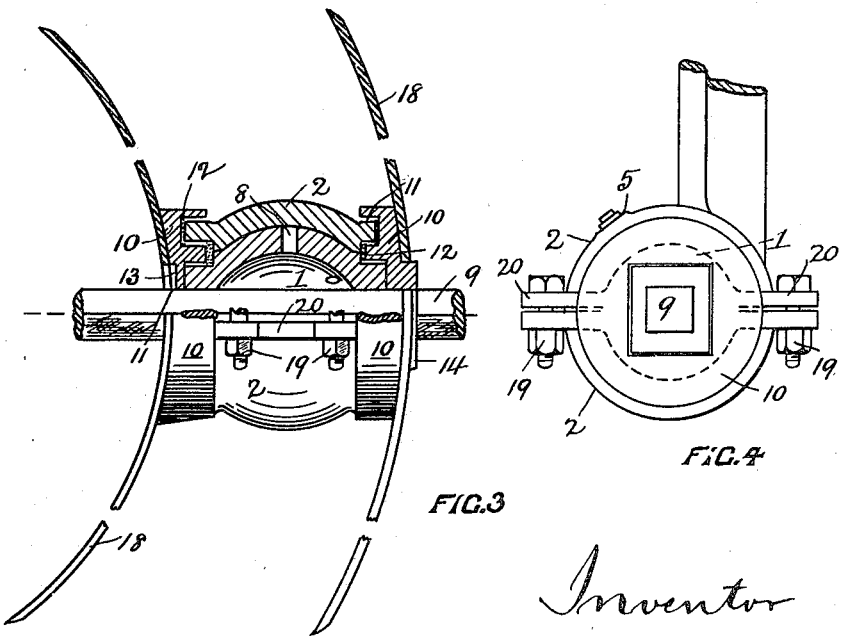
Figure 5:
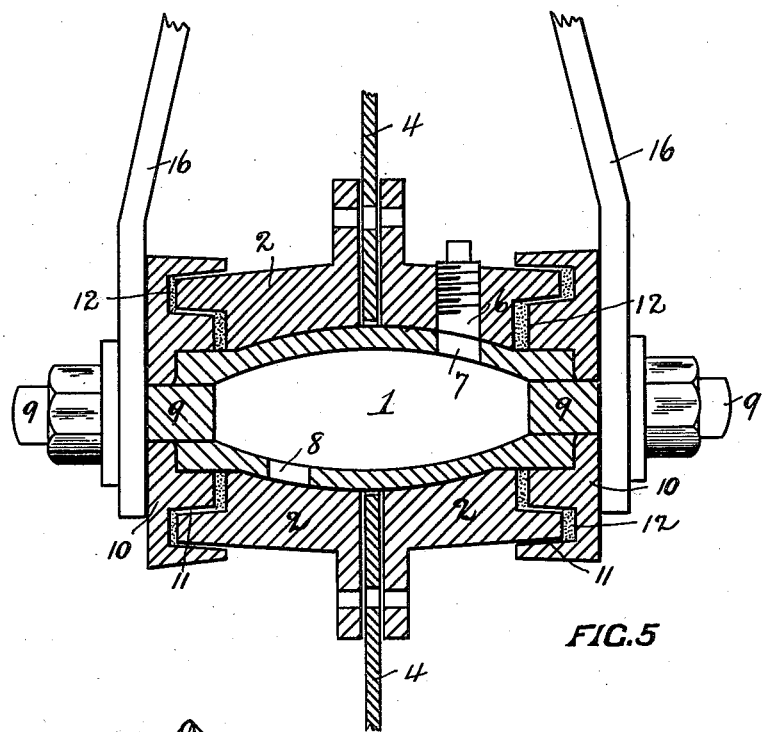

In the accompanying drawings:—Figure 1 is a sectional elevation of a plow wheel bearing. Fig. 2 is an elevation of the hollow axle. Fig. 3 shows my invention applied to a disk harrow. Fig. 4 is an end view of same, the disks not being shown. Fig. 5 is a sectional elevation of the bearing applied to a circular skeith, and Fig. 6 shows end of skeith forks and slot for reception of the bearing spindle or axle.
Similar figures of reference refer to corresponding parts throughout all of the figures.

Referring first to Figs. 1 and 2, (1) is the hollow casting of approximately pear shape which is firmly attached to one end of a fixed bolt (9) carried in a depending member (15) of the plow frame. (2) is the hub or boss of a plow wheel (3) and which boss is so shaped as to fit closely around the casting (1) so as to be free to revolve thereon. The hub (2) is preferably made in two portions bolted together as shown in Fig. 1 to allow of it being placed upon or removed from the axle thus formed by the casting (1), at will. A sandwasher (10) formed preferably with concentric grooves (1) in its outer face is securely fixed upon the bolt (9) between the frame member (15) and the inner face of the hub (2) which face is grooved to receive the concentric projections on the adjacent face of the washer. Rubber or like packing rings (12) are inserted between the adjacent faces of the washer and the hub and the pressure on such rings is regulated by means of the nut screwed upon the end of the bolt (9) shown by dotted lines in Fig. 1. The wall of the casting 1 is formed with a number of apertures (8) therein and with an aperture (7) adapted to coincide with a hole (6) passing through a strengthened portion (5) of the hub (2). When the holes (6) and (7) are arranged to coincide, the lubricating oil may be fed into the space within the casting (1) so as to fill it to any desired degree. The oil will then pass through the apertures (8) so as to lubricate the joint between the hub and its axle. Any escape of oil or intrusion of dirt into the bearing will be prevented by the washer (10) and its packing.

In Figs. 3 and 4 the adaptation of the invention to a disk harrow is shown. In this arrangement the casting (1) is fixed upon the spindle (9) so as to rotate therewith. The bearing (2), which in this instance corresponds to the hub in Fig. 1, surrounds the casting and is attached to the frame of the machine in any approved manner. A washer (10) is placed on the spindle at each end of the casting (1) and these washers engage with the end faces of the bearing (2) and serve to keep the spindle in its proper position and to prevent any leakage of oil. The washer at one end is formed with a recess (13) and at the other end with a boss (14) and these washers are arranged alternately throughout the series so that the boss on one washer fits within the recess on the next and thus serve to lock the disks (18) placed between them on to the spindle. In this instance the hollow spindle rotates while the portion enveloping it remains stationary, which portion is divided into two halves fitting over the casting secured together in the manner shown in Fig. 4.

Figure 6:
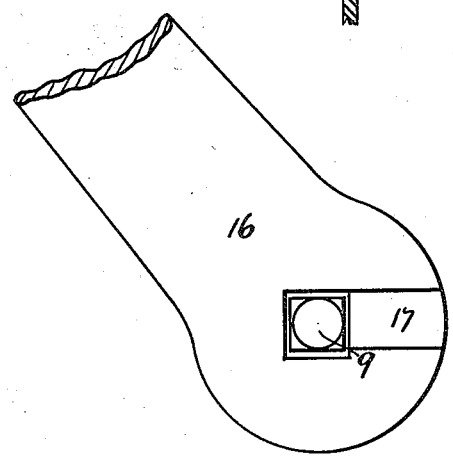

The arrangement shown in Figs. 5 and 6 adapting the invention to skeith bearings is similar to the arrangement shown in Fig. 1 save that the casting (1) has a bolt (9) secured to each end to adapt it for being carried by the skeith forks (16). A washer (10) is also provided at each end. In this case the casting (1) constitutes an axle which remains stationary while the boss or hub (2) to which the skeith (4) is secured by being fastened between two halves of such boss in the manner shown in Fig. 5, rotates upon such casting. In order to facilitate the introduction of the axle between the forks (16) a slot (17), Fig. 6, is cut in each of the forks. This slot leads into the opening made for the reception of the bolts (9). By these means the whole bearing may be easily slid into place after being assembled.

In all cases strips of rubber or other suitable material are placed between the flanges constituting the joints between the two halves of the portion enveloping the casting (1) so that any wear may be compensated for as required.

Having now described my invention, what I claim as new and desire to secure by Letters Patent is:—

In a bearing the combination of an axle member, a hollow pyriform bearing member open at its outer end and secured at its inner end to the outer end of said axle member, said bearing member being provided with a plurality of openings and a feed hole, a two part hub inclosing said bearing member, the outer end of said hub being slightly spaced apart from the outer end of said bearing member, said hub being provided with a feed inlet adapted to register with the feed hole of said bearing member, a frame member provided with an aperture for receiving said axle member, a sand ring interposed between said frame member and the bearing and hub members, said sand ring being provided with a plurality of annular recesses and ribs, said hub and bearing member being provided with an annular recess and rib interfitting the ribs and recesses of said sand ring, packing interposed between the interfitting ribs and recesses, and a nut for said axle member maintaining the parts in close engagement.

In testimony whereof, I have signed this specification in the presence of two subscribing witnesses.

WILLIAM BREW.

Witnesses:
PERCY RICHMOND CLIMIE,
JOHN HAZLITT UPHAM.